March 26, 1968  W. B. ANTHONY  3,375,116
PROCESS OF RECOVERING FEED PRODUCTS FROM ANIMAL WASTES
Filed Nov. 26, 1963  2 Sheets-Sheet 1

INVENTOR
W. BRADY ANTHONY
BY
Shoemaker and Mattare
ATTORNEYS 3,375,116
PROCESS OF RECOVERING FEED PRODUCTS
FROM ANIMAL WASTES
Wilson Brady Anthony, P.O. Box 447,
Auburn, Ala. 36830
Filed Nov. 26, 1963, Ser. No. 326,123
7 Claims. (Cl. 99—2)

ABSTRACT OF THE DISCLOSURE

A method of recovering nutrients and feed from animal manure comprising forming a mixture of manure and water, dewatering the mixture and using the dewatered matter as feed, and subsequently allowing the wash water to settle. The wash water forms two layers, the bottom layer of which is used as a feed for animals, either liquid, or it can be dried and used as a solid feed.

---

Figure 1:
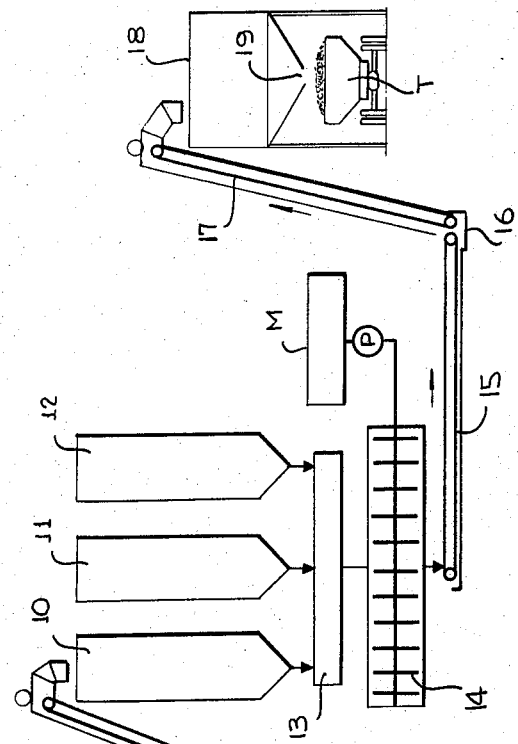
Figure 1:
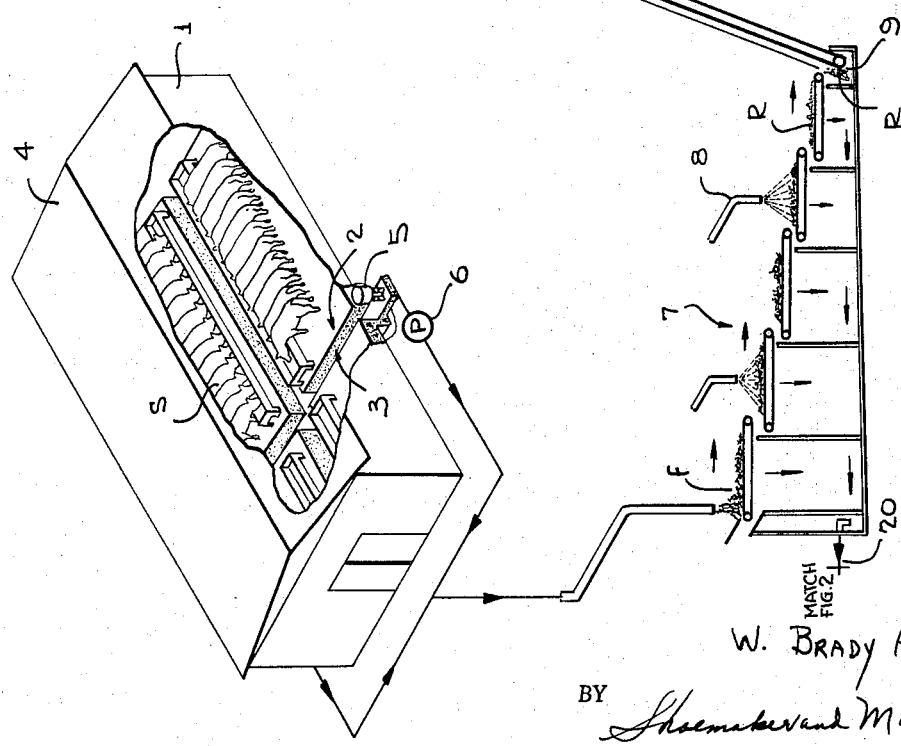

This invention relates to a process for recovering nutrients from animal manure. More specifically, the invention is a process for recovering undigested materials, vitamins, bacteria and protozoa from animal manure and using same as feed for the animal. Some of the animals are beef cattle, dairy cattle, sheep, swine and other livestock.

Present day trends are for both dairy and beef cattle to be managed in confinement within a suitable enclosure. Developments in recent years have caused an increase in the use of concentrated feeds for both dairy and beef cattle. Formerly, swine were used to salvage grain voided in the feces of cattle fattened on high grain rations. Changes brought about by mechanization and specialization in livestock enterprises, coupled with the fact that grains are now ground for feeding, are major factors responsible for the decline in interest in placing pigs in pens with cattle. Due to this change, fecal grain represents an appreciable loss of feeding value and also creates a serious disposal problem. Odors and flies caused by large volume cattle feeding operations and thus more and more manure, are creating urban health problems. The present invention, therefore, is indeed satisfactory and commercially feasible in that it not only contemplates recovery of nutrients, which are valuable, from the fecal matter, but also provides a process of sanitarily disposing of the fecal matter.

Animals having relatively large digestive tracts void a relatively large amount of undigested material in the fecal matter and aspecially when such animals are full fed. Micro-organisms within the animals synthesize large quantities of vitamins and an appreciable portion of these vitamins escape absorption and appear in the fecal matter. Likewise, a considerable quantity of bacteria and protozoa found in the animal escapes digestion and appears in the feces. This microbial residue represents a valuable source of protein. The feces of animals, therefore, contain valuable nutrients which are recovered by the process of the instant invention for use as feed. At the same time the daily removal of feces from the pens of confined cattle aids sanitation in these operations and provides a method of disposal of this matter.

It is, therefore, an object of the invention to provide a new process for recovering different nutrients from the manure of animals.

Another object of the invention is to provide a process whereby the feces of confined animals are processed to yield valuable animal feed while providing an effective sanitation program.

A further object of the invention is to provide a feed supplement obtained from the fecal matter of confined animals which may be in wet or dry form.

Another object of the invention is to provide a process for treating feces wash water for effective use as a liquid feeding supplement for swine.

A still further object of the invention is to provide a process for treating fecal matter of confined livestock by washing and screening the matter in a novel way to obtain the undigested material and subsequently treating the wash water from the fecal matter to obtain a liquid feed supplement for swine or further drying said wash water to obtain a dry feed supplement.

Figure 2:
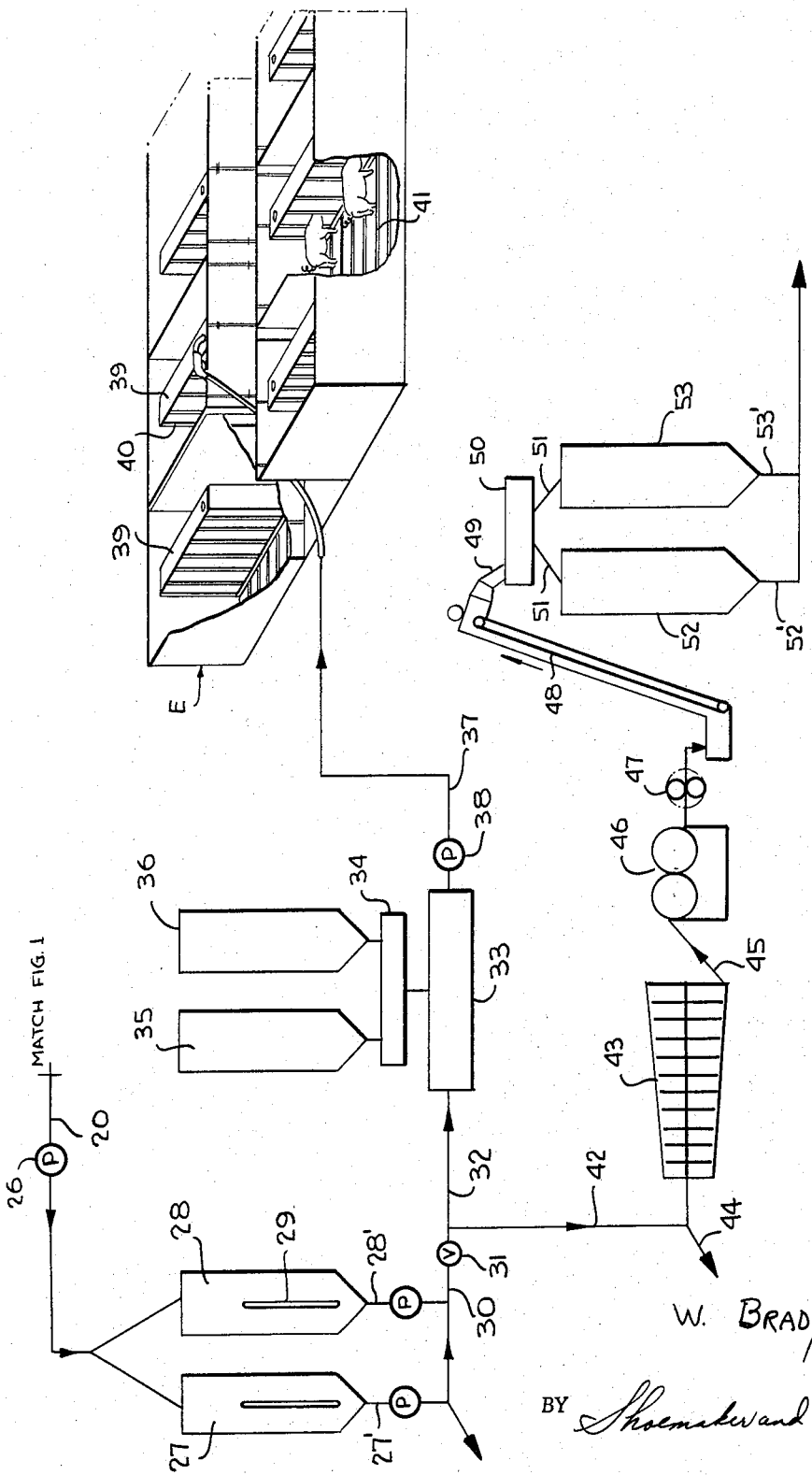

Other objects and advantages of the invention will be seen in the following detailed description and drawings wherein:

FIG. 1 is a diagrammatic illustration of the apparatus for carrying out one of the processes, and FIG. 2 is a diagrammatic illustration of the apparatus for carrying out two alternative processes along with the process of FIG. 1.

Essentially the over-all process of the instant invention consists of managing a relatively large number of animals such as beef, dairy cattle, sheep or the like in confinement on a hard surface or on slotted floors. The floor is cleaned daily and in the process the manure is collected in a pit. In most operations, water will be used to clean the floors and wash the manure into the pit. The coarse material remaining on the screen is conveyed to a mixer and blended with premix and fed back to the cattle or, if desired, it is passed over a dryer and stored.

If desired the residue may be squeezed to remove more water as it leaves the screen. The moisture content of the mixture will be about 30%. The amount of residue put back in the feed equals the amount collected on an individutl steer basis. An excellent premix for blending with the fecal residue is ground snapped corn, 88%, protein supplement 10%, dicalcium phosphate 1%, salt 1%, trace minerals and vitamin A. This material may then be fed back to the animals. If not desired for refeeding (as may be the situation regarding milking herds), it is passed over a dryer, ground and stored. The product may then be mixed with the feed premix and sold.

When a collection pit is used, an agitator located in the pit conditions the manure to a slurry. A suitable pump is located at the bottom of the pit and the slurry is pumped to a vibrating screen, where much water is used in flushing the feces into the pit, the vibrating screen has the single function of dewatering. In situations where the feces is collected through the use of very little water, the vibrating screen must serve as a place for washing as well as dewatering, however, where a small amount of manure is to be collected from a few animals, it, of course, can be done manually by hand shovelling the manure directly upon a vibrating screen.

In the case of small herds where the manure is collected and deposited directly on the screen, a pump and agitator are not needed. The manure should be removed from the feeding area and processed daily. Sanitation is enhanced by daily cleaning, however, the nutritive value of the recovered product will not be materially altered if it remains on the feedling floor as long as 48 hours.

The wash water is collected as it passes through the vibrating screen and pumped to settling tanks where it remains for approximately 24 hours. It may be pumped through a separator in large scale operations. The lower layer which contains most of the solids is used as the liquid phase in a liquid feeding system for swine. The upper layer is discarded. In most instances, the lower layer will contain a minimum of 4–7 percent solids and approximately 25 percent crude protein on a dry matter basis. In addition, the material will contain an appreciable amount of B-vitamin and mineral. The composition will be dependent to a degree upon the kind of feed ingredients fed the donor animals. Analyses on one example of dried fecal wash water revealed the following composition:

| | Percent |
|---|---|
| Crude protein | 26.49 |
| Ether extract | 2.71 |
| Cellulose | 11.29 |
| Ash | 2.41 |

For hogs 75 pounds to market weight (200 pounds), the wash water can be used to supply daily from 1–2 pounds of dry matter per animal. The liquid feed is conveyed to the feeder by a pipe and a hose with a nozzle is satisfactory for filling the feeder. The swine should be fed at least two times daily. No other water should be provided. When the wash water (from settling tanks) is used to feed sows, the ratio of wash water to feed would be varied to fit the productive stage of the animal.

A suitable premix formula is as follows: corn, 87.5%, supplement 10%, swine salt 1%, dicalcium phosphate 1%, ground limestone 0.05%, plus an antibiotic. A 100 pound pig can be fed about the quantity of wash water (from settling tanks) collected from one steer. In general, a 100 pound pig would receive about 2 lbs. of solids from the wash water if consumed and would need, in addition, about 3.5 pounds of the premix. This ratio may be modified to serve the specific operation. The wash water furnishes valuable amino acids and beef vitamins required by swine.

If not desired for immediate feeding the wash water may be pumped through a separator (or evaporator) where the solids are collected, and then dried and bagged. The dried solids would have a variable composition, but should be standardized by blending with other feed ingredients. It is possible also to concentrate the wash water and prepare for sale a semi-solid product. In some operations it may be desirable to blend the dried, wash water solids with the coarse residue separated by the vibrating screen. There are, therefore, many alternate methods of utilizing the fecal residue as a feed.

As shown in FIG. 1, there is disclosed a barn 1 but it is to be understood that any other suitable confining structure or means may be utilized in place of the barn. The confining means, such as a barn, preferably has sloping concrete floors 2. In the floor structure, there is provided collection pits 3 for collecting fecal matter from the confined animals. The manure collection is most effective when the animals are maintained on either a concrete slanted floor or a slotted floor or the like. The barn or other suitable confining structure may or may not be provided with a roof 4, for in the drier areas of the country the roof may be omitted.

Still with regard to FIG. 1 and for the purposes of illustration, steers S are indicated as being confined. Dairy herds would normally be provided loose housing with conventional comfort stalls. The floors of the enclosure are preferably washed daily by flushing or hosing with water. The floor should slope toward the aforesaid collection pits 3. The collection pits 3 are provided with an agitator 5 which, of course, when in use, is inside the barn and preferably in the pit. The agitator forms a slurry of the water and the manure and a pump 6 conducts the slurry to vibrating washer screen means 7.

The vibrating screen means 7 performs its usual dewatering function. Where limited water is used in making the initial slurry, it will usually be desirable to carry out further washing of the manure by means of spray pipes 8 and this is accomplished while the manure passes over the vibrating screens which, as illustrated in FIG. 1, are in stepped relationship. The coarse fibrous water residue R is deposited at 9 in the screen means and from there this water residue is conveyed to a suitable holding bin 10. A grain holding bin 11, and a feed supplement holding bin 12 are provided and all of the said bins discharged into common manifold type weight hoppers 13 and there the said wet residue grain and supplement are commingled and from the said weight hoppers the commingled material is conducted to a mixer 14 and to the mixture in the mixer, molasses from a source M, may be added if desired. The mixture from the mixer is discharged onto a conveyor 15 to a suitable trough-like member 16 and from this trough-like member 16 the mixture is conveyed by an elevator or similar device 17 into a storage discharge bin 18, which bin has a controlled outlet 19 for releasing the said mixture into a truck T or the like.

The mixture of the wet residue with the grain and feed supplement added thereto is a complete feed for cattle.

The apparatus for carrying out the process goes further than the hereinbefore described complete process in that the water that is utilized in watering the manure on the screens, it has been found, contains valuable vitamins, bacteria and protozoa and microbial residue which represents a valuable source of protein. Therefore, it is important that these valuable constitutents be not wasted. The water is taken from the vibrating screen means 7 by means of a suitable conduit 20 with the pump 26 therein and is substantially equally discharged in the upper ends of settling tanks 27 and 28, each of which tanks being preferably provided with sight glass 29 for purposes of determining the amounts of liquid in the same. The water from each tank 27 and 28 is discharged through pump control conduits 27′ and 28′ into a conduit 30 having a valve 31 therein to either one of two sources, the first being by means of a conduit 32 to a slurry mixer 33 into which slurry mixers through a weigh hopper 34 suitable tanks 35 and 36 discharge said supplement or other such addition to the water in the slurry mixer. From the slurry mixture there is a conduit 37 with a pump 38 therein, and this conduit discharges into suitable liquid swine feeders 39 which are in compartments 40 for feeding the liquid to the swine. These compartments 40 may be in any suitable enclosure generally indicated at E with or without a roof depending on weather and climatic conditions and the floors 41 of the compartment or housing or whatever it may be are such as to be readily and sanitarily cleaned by hosing or other suitable means.

The alternate further process is that instead of conducting the water from the tanks 27 and 28 to the slurry mixture, that water or part thereof is conducted by means of a suitable conduit 42 to a liquid-solid separator 43 and the liquids from the separator are discharged to a sewer or the like as at 44, whereas the solids are conveyed as at 45 to a drum dryer 46 and from that dryer 46, the dried material is ground by a suitable grinder 47 and from the grinder the material is placed into an elevator conveyor 48 from which conveyor 49 the material is discharged into a divider 50 and from the divider by means of suitable conduits or other such means 51, the material is discharged into the tops of storage bins 52 and 53. The storage bins at their bottoms are provided with outlet conduits 52′ and 53′ respectively to discharge into any suitable place where the feed material which has been ground and dried for purposes of bagging or containing the same in other suitable containers.

In the alternate process for the fecal wash water, the solids may be concentrated by separation as stated above or the solids as well as dissolved nutrients may be concentrated by evaporation. The concentrated wash water (after separation or evaporation) would contain much microbial residue, fine particle feed residue, B-vitamin and other undefined biological and organic residue. This product has value as a feed supplement for various classes of animals. It is also valuable for inclusion in medium use for commercial growth of micro-organisms. Although the product can be used in a semi-solid state, the dried material has wider use than this. In commercial operations the product would need to be blended with other feed ingredients to produce a standard product.

The following tests were made on three steers to show the efficacy of the feed supplement:

Yearling steers were confined on concrete and fed a high grain feed mixture. The manure was collected daily and thoroughly mixed with water. Solid material was allowed to settle and the aqueous layer was poured off. The water washing was repeated and the fecal residue remaining was stored at approximately 33° F. until needed for feeding. The wet fecal residue was mixed with the basal feed (Table 1) in the ratio of 40 parts of wet residue to 60 parts of basal feed. Feed was mixed thoroughly and at the time of mixing, dried yeast was added at the rate of 1 pound per 100 pounds of feed. The final mixture was held in burlap bags about 12 hours before feeding.

TABLE 1.—BASAL MIXTURE

| Ingredient: | Amount, percent |
|---|---|
| Soybean meal | 16.00 |
| Ground ear corn | 64.20 |
| Cane molasses | 16.70 |
| Salt | 1.67 |
| Dicalcium phosphate | 0.83 |
| Vitamin A | Trace |
| Stilbestrol | Trace |

Three yearling steers were used in the feeding test. These cattle performed satisfactorily on a steer fattening feed for 7 weeks prior to the time they were placed on test. A 14 day preliminary feeding period on the test ration preceded the experimental period.

TABLE 2.—PERFORMANCE DATA FOR CATTLE FED WASHED FECAL RESIDUE

| Animal No. | Initial Weight (lb.) | Final Weight (lb.) |
|---|---|---|
| 1 | 720 | 880 |
| 2 | 760 | 970 |
| 3 | 595 | 775 |
| Avg. weight | 692 | 975 |
| Gain (lb.) | | 183 |
| Days on test | | 54 |
| Daily gain (lb.) | | 3.39 |
| Feed dry matter per hundredweight gain (lb.) | | 643 |

The performance status of the cattle are summarized in Table 2. No difficulty was experienced in getting the cattle to consume the experimental feed. No outward symptoms of harm resulted to the cattle as a consequence of consuming the mixture containing fecal residue. Daily live weight gain and feed efficiency of the cattle were excellent for steers of this weight, age and condition. Cattle fed the fecal residue mixture gained over 3 lbs. daily and required less than 700 lbs. of dry matter per 100 pounds of gain.

The vibrating screens used for washing and dewatering the fecal matter may vary between 60 and 100 mesh.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A process of recovering nutrients from animal manure for feeding to animals such as livestock and swine comprising collecting the manure, forming a mixture of manure and water, dewatering said mixture, recovering the dewatered matter and feeding said matter to animals, collecting the wash water and recovering valuable nutrients from the wash water.

2. The process of claim 1 wherein the wash water is allowed to settle, the top layer is discarded and the bottom layer is fed to animals.

3. The process of claim 1 wherein the wash water is allowed to settle, the top layer is discarded, and the solids in the bottom layer are separated, dried, and fed to animals.

4. The process of claim 1 wherein the dewatered matter is of a size of between +60 and +100 mesh.

5. The process of claim 2 wherein the wash water is allowed to settle for about 24 hours.

6. The process of claim 1 wherein the animal manure is livestock manure.

7. The process of claim 3 wherein the solids recovered from the wash water are mixed with the dewatered matter and fed to animals.

References Cited

UNITED STATES PATENTS

| 361,367 | 4/1887 | MacIvor | 71—12 |
| 1,123,414 | 1/1915 | Smith | 71—13 |
| 1,561,667 | 11/1925 | Schmelzer | 71—14 |
| 1,890,459 | 12/1932 | Fluck et al. | 71—13 |
| 1,911,282 | 5/1933 | Moreton | 71—13 |
| 1,945,051 | 1/1934 | Laughlin | 71—12 |
| 970,711 | 9/1910 | Hoskins | 71—21 |

DONALL H. SYLVESTER, *Primary Examiner.*

ANTHONY SCIAMANNA, T. D. KILEY, R. BAJEFSKY, *Examiners.*